(12) United States Patent
Takahashi et al.

(10) Patent No.: US 8,717,769 B2
(45) Date of Patent: May 6, 2014

(54) ELECTRONIC APPARATUS

(75) Inventors: Issei Takahashi, Ome (JP); Tomohiro Hamada, Tachikawa (JP); Tomoko Kitamura, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/219,327

(22) Filed: Aug. 26, 2011

(65) Prior Publication Data

US 2012/0134109 A1    May 31, 2012

(30) Foreign Application Priority Data

Nov. 30, 2010  (JP) ................. 2010-267578

(51) Int. Cl.
*H05K 1/00* (2006.01)
*H05K 1/18* (2006.01)
*H05K 7/02* (2006.01)
*H05K 7/06* (2006.01)
*H05K 7/08* (2006.01)

(52) U.S. Cl.
USPC ............ 361/748; 361/679.01; 361/679.06; 361/752

(58) Field of Classification Search
USPC ............. 361/679.1–679.7, 730, 752
See application file for complete search history.

(56) References Cited

U.S. PATENT DOCUMENTS

| | | | |
|---|---|---|---|
| 4,444,520 A * | 4/1984 | Hanakata et al. | 400/88 |
| 6,623,152 B1 * | 9/2003 | Kroening | 362/555 |
| 8,425,079 B2 * | 4/2013 | Shiroishi et al. | 362/241 |
| 2005/0040972 A1 * | 2/2005 | Hamada et al. | 341/22 |
| 2006/0114238 A1 * | 6/2006 | Wong et al. | 345/173 |
| 2009/0135139 A1 * | 5/2009 | Wong et al. | 345/157 |
| 2009/0244820 A1 * | 10/2009 | Kusaka et al. | 361/679.1 |
| 2010/0201822 A1 * | 8/2010 | Ichimura et al. | 348/161 |

FOREIGN PATENT DOCUMENTS

| | | |
|---|---|---|
| JP | H54-88282 U | 6/1979 |
| JP | H04-4321 U | 1/1992 |
| JP | H06-21085 U | 3/1994 |
| JP | 06-236156 | 8/1994 |
| JP | 08-101388 | 4/1996 |
| JP | 2000-208967 | 7/2000 |
| JP | 2002 268591 A2 | 9/2000 |

* cited by examiner

*Primary Examiner* — Tuan T Dinh

(74) *Attorney, Agent, or Firm* — Knobbe Martens Olson & Bear LLP

(57) ABSTRACT

According to one embodiment, an electronic apparatus includes a housing including a transparent portion, a printed circuit board contained in the housing, a light source provided on the printed circuit board, a first member, a second member, and a reinforcing plate. The first member includes a first opening portion configured to allow light emitted from the light source to the transparent portion to pass therethrough, and a duct-shaped first main body defining the periphery of the first opening portion. The second member includes a second opening portion configured to allow light emitted from the light source to the transparent portion to pass therethrough, and a duct-shaped second main body defining the periphery of the second opening portion, and brought into contact with the first member so that the first opening portion communicates with the second opening portion.

16 Claims, 8 Drawing Sheets

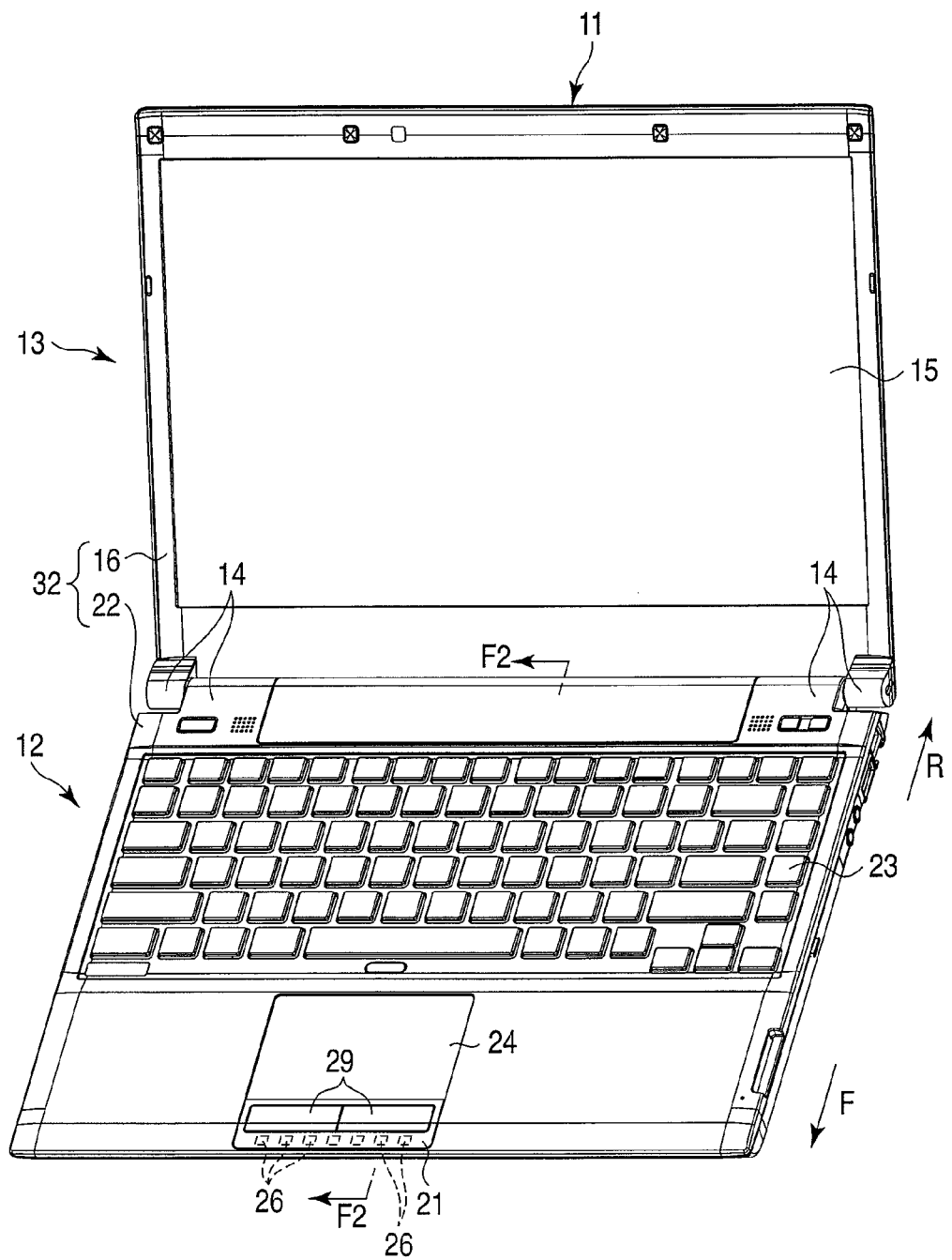
F I G. 1

F ← → R

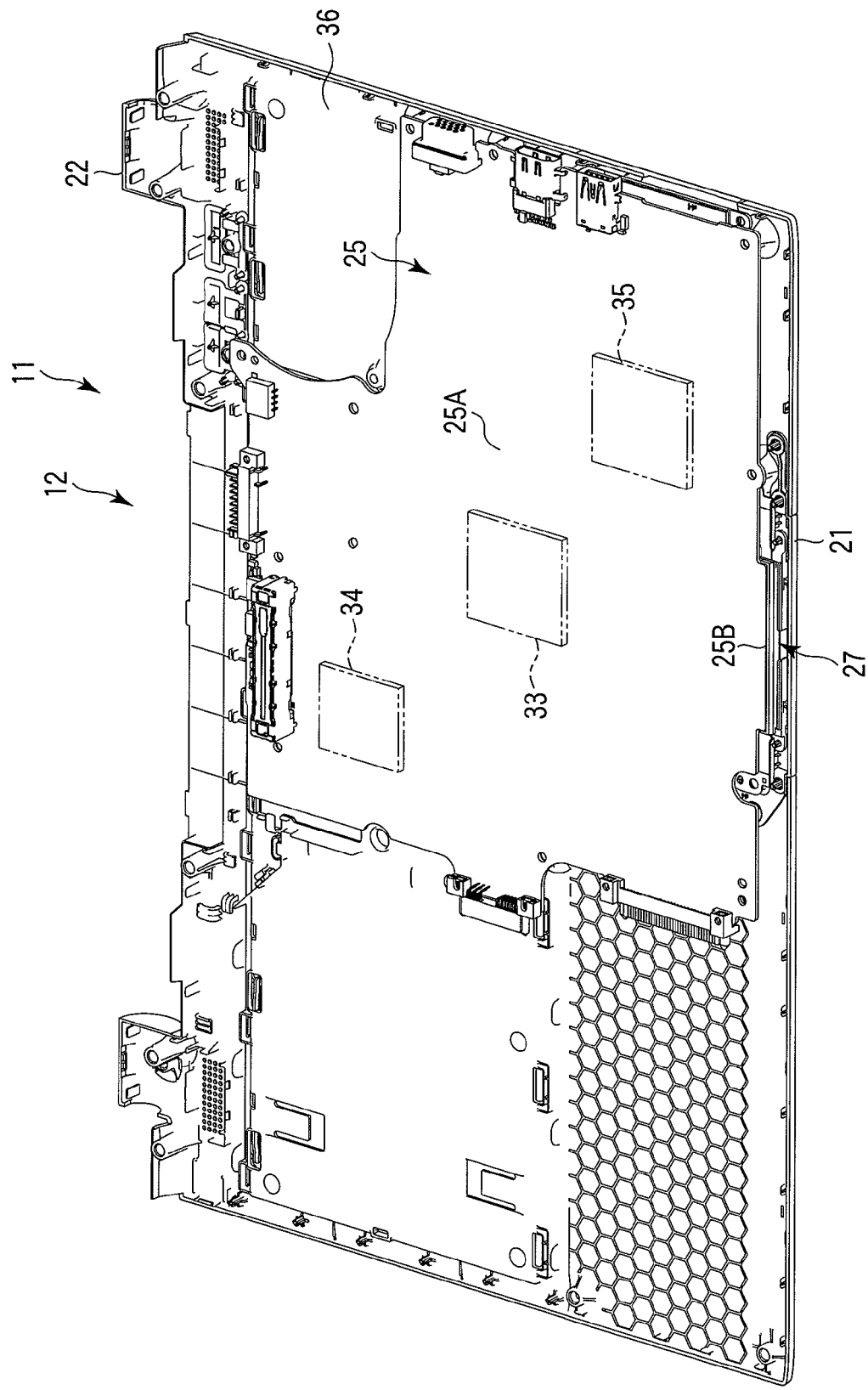
F I G. 5

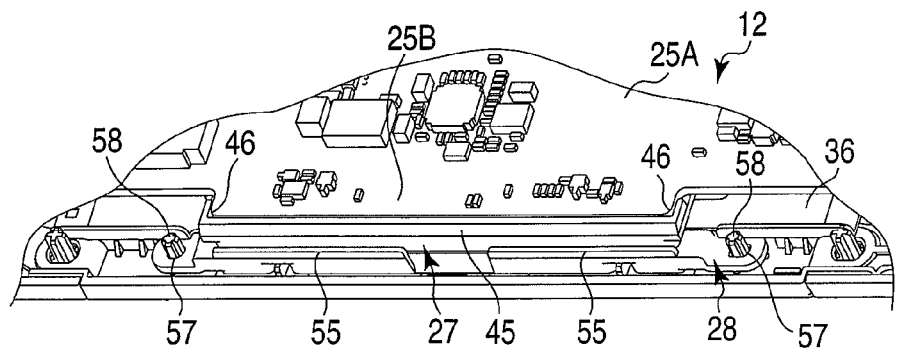
F I G. 6
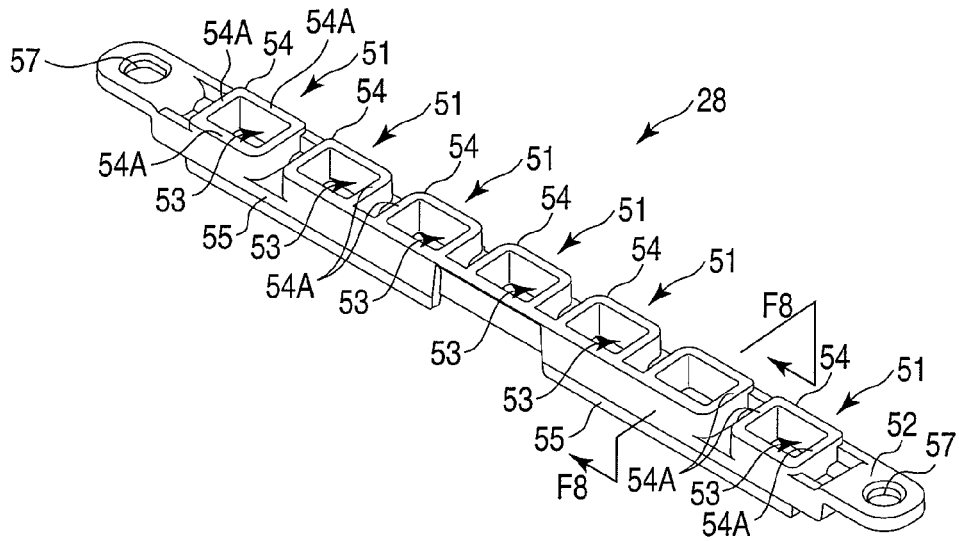
F I G. 7
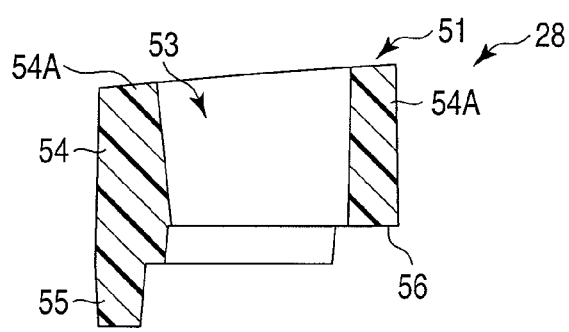
F I G. 8

ELECTRONIC APPARATUS

CROSS-REFERENCE TO RELATED APPLICATIONS

This application is based upon and claims the benefit of priority from Japanese Patent Application No. 2010-267578, filed Nov. 30, 2010; the entire contents of which are incorporated herein by reference.

FIELD

Embodiments described herein relate generally to an electronic apparatus comprising a light emitting part.

BACKGROUND

In electronic apparatuses, a light emitting part employing an LED is often provided aside from a main display screen. Some electronic apparatuses are configured to prevent leakage of light from the light emitting part.

Such a light emitting part employing an LED is variously applicable, and there has been a need to improve the light emitting part used for electronic apparatuses.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view showing a portable computer which is an example of an electronic apparatus according to a first embodiment.

FIG. 5 is an exemplary perspective view showing the printed circuit board and first member of the portable computer shown in FIG. 3.

FIG. 6 is an exemplary enlarged perspective view of the printed circuit board and first member shown in FIG. 5.

FIG. 7 is an exemplary perspective view showing a second member of the portable computer shown in FIG. 3.

FIG. 8 is an exemplary sectional view taken along line F8-F8 shown in FIG. 7.

DETAILED DESCRIPTION

Figure 2:
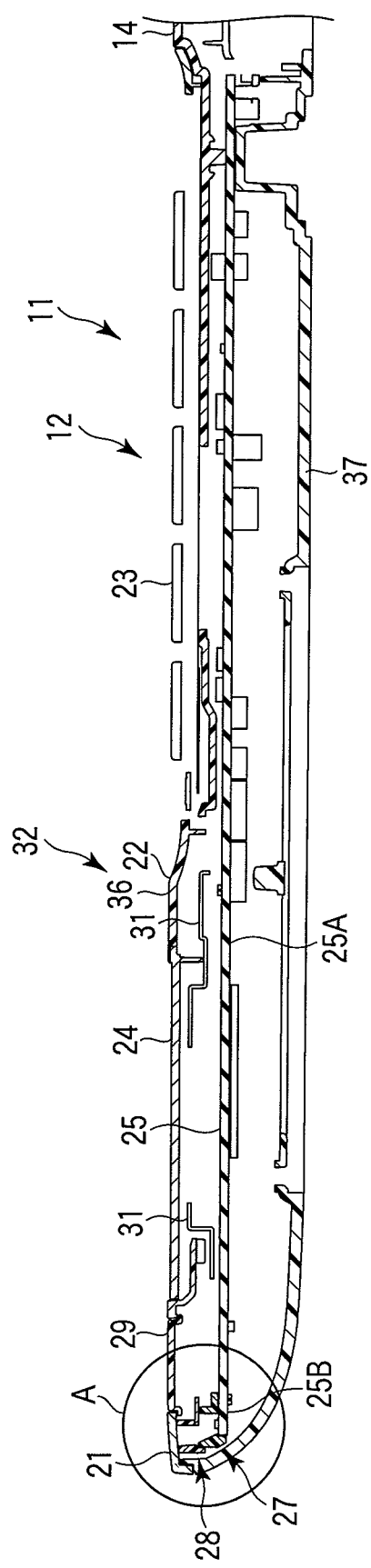
FIG. 2 is an exemplary sectional view taken along line F2-F2 shown in FIG. 1.

Various embodiments will be described hereinafter with reference to the accompanying drawings.

In general, according to one embodiment, an electronic apparatus includes: a housing including a transparent portion; a printed circuit board contained in the housing; a light source provided on the printed circuit board; a first member; a second member; and a reinforcing plate. The first member includes: a first opening portion configured to allow light emitted from the light source to the transparent portion to pass therethrough; and a duct-shaped first main body defining the periphery of the first opening portion. The second member includes: a second opening portion configured to allow light emitted from the light source to the transparent portion to pass therethrough; and a duct-shaped second main body defining the periphery of the second opening portion, and brought into contact with the first member so that the first opening portion communicates with the second opening portion.

Referring to FIGS. 1-10, embodiments of a portable computer, which is an example of an electronic apparatus, will be described. In this embodiment, the near side to the user (that is, the user side) is defined as front F, the far side from the user is rear R, the left-hand side of the user is left, the right-hand side of the user is right, the upper side from the user's position is up and the lower side from the user's position is down.

As shown in FIG. 1, the portable computer 11 comprises a main unit 12, a display unit 13 configured to cover the main unit 12 and stand relative to the main unit 12, and a hinge unit 14 provided between the main unit 12 and the display unit 13. The hinge unit 14 couples the main unit 12 to the display unit 13 in such a manner as to enable the display unit 13 to rotate relative to the main unit 12.

The display unit 13 comprises a display panel 15 (display device), and a display cabinet 16 surrounding the periphery of the display panel 15. The display panel 15 is formed of, for example, a liquid crystal panel in a rectangular plate shape. The display panel 15 may be another type of display panel, such as a plasma display panel or an organic electroluminescent panel.

Figure 3:
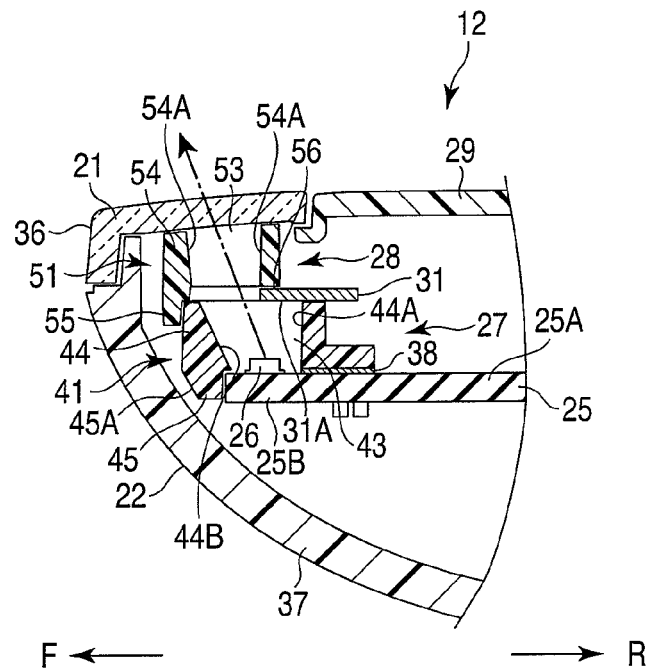
FIG. 3 is an exemplary enlarged sectional view of portion A shown in FIG. 2.

As shown in FIGS. 1-3, the main unit 12 comprises: a main body cabinet 22 comprising a transparent portion 21 and forming the outer shell; a keyboard 23 attached to the outer surface of the main body cabinet 22; a touchpad 24; a button 29; a printed circuit board 25 (mother board) contained in the main body cabinet 22; a plurality of light sources 26 provided on the printed circuit board 25; a first unit 27 fixed to the printed circuit board 25 in the vicinity of the light sources 26; a second unit 28 fixed to the inner surface of the transparent portion 21; and a reinforcing plate 31 provided between the first unit 27 and the second unit 28. The display cabinet 16 and the main body cabinet 22 form a housing 32.

The printed circuit board 25 collectively controls the entire portable computer 11. As shown in FIG. 5, the printed circuit board 25 comprises: a main portion 25A to which a plurality of main circuit components, such as a CPU 33, a north bridge 34, and a graphics chip 35, are fixed; and an extending portion 25B which is a small piece projecting from the main portion 25A.

The transparent portion 21 is formed of, for example, a transparent resin material. As shown in FIG. 3, the transparent portion 21 is located at an oblique position shifted from a position facing the light sources 26. The transparent portion 21 allows light emitted from the light sources 26 to pass therethrough, and can notify a user of various information from the portable computer 11.

The light sources 26 are each formed of, for example, an upward-lighting-type light emitting diode. The light emitting diode has a viewing angle of, for example, 120 to 170 degrees. The transparent portion 21 is provided within the range of the viewing angles of the light sources 26. As shown in FIGS. 1 and 2, seven light sources 26 are laterally aligned on the extending portion 25B of the printed circuit board 25 in the present embodiment.

The main body cabinet 22 comprises an upper first case 36 and a lower second case 37 provided separately from the first case 36. The first case 36 has a light blocking property as a whole, but comprises the transparent portion 21 as a part.

Figure 4:
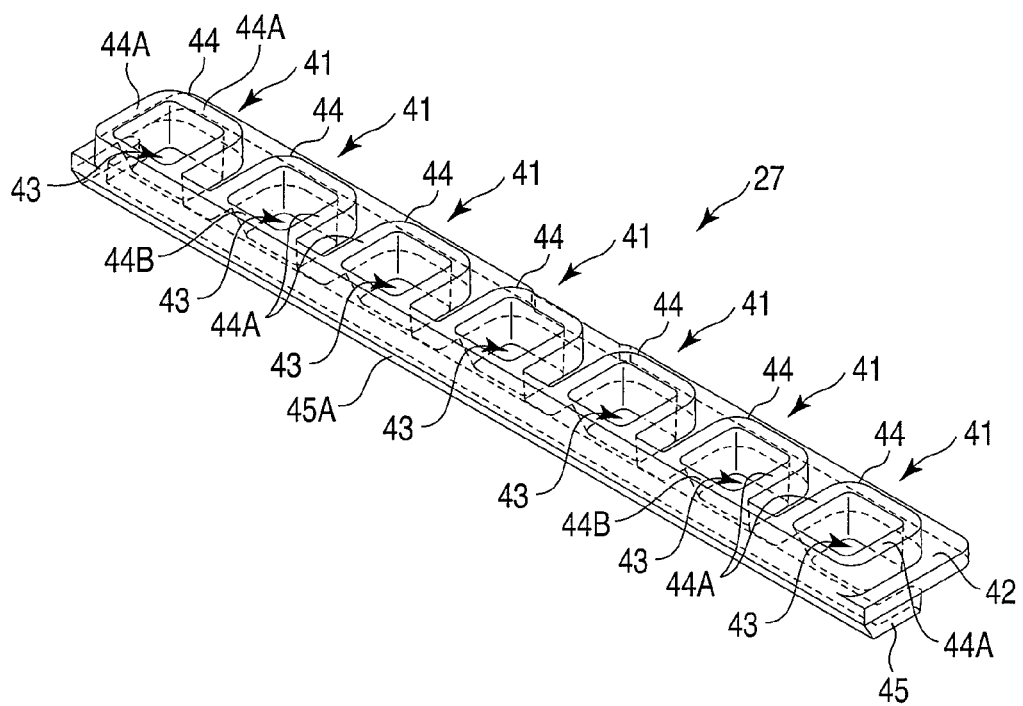
FIG. 4 is an exemplary perspective view showing a first member of the portable computer shown in FIG. 3.

The first unit 27 is fixed to the printed circuit board 25 by, for example, double-sided tape 38 as shown in FIG. 3, but may be attached by other means. As shown in FIG. 4, the first unit 27 comprises a plurality of first members 41 and a first coupling portion 42 substantially flat-shaped and coupling the first members 41. The first unit 27 is formed of, for example, a synthetic resin material having a light blocking property as one body, but may be formed of a metallic material. Each of the first members 41 comprises a first opening portion 43 configured to allow light emitted from a light source 26 to the transparent portion 21 to pass therethrough, a duct-like first main body 44 defining the periphery of the first opening portion 43, and a protruding portion 45 protruding from the first main body 44. In the present embodiment, the first unit 27 comprises seven first members 41 in total in correspondence with the seven light sources 26.

In a state where the first unit 27 is attached to the printed circuit board 25, the first main body 44 surrounds the four sides of each of the light sources 26. The first main body 44 comprises three first walls 44A extending in a direction crossing or orthogonal to the printed circuit board 25, and one second wall 44B slantingly provided relative to the printed circuit board 25. The second wall 44B is slanted along an imaginary line connecting the light source 26 and the transparent portion 21. Therefore, the first main body 44 is slanted as a whole along the imaginary line connecting the light source 26 and the transparent portion 21.

As shown in FIGS. 5 and 6, the protruding portions 45 protruding from respective first main bodies 44 are continuous and integral with each other, and are each U-shaped, for example. The protruding portions 45 surround the outer edge of the extending portion 25B of the printed circuit board 25, and protect the extending portion 25B so as to prevent chipping or cracking at corners 46 of the extending portion 25B. The protruding portions 45 may be separately provided in correspondence with the first main bodies 44.

As shown in FIGS. 3 and 4, the protruding portion 45 comprises an opposed part 45A which is opposed to the second case 37 of the main body cabinet 22. The opposed part 45A is slanted along the inner surface of the second case 37.

As shown in FIG. 7, the second unit 28 comprises a plurality of second members 51, and a second coupling member 52 substantially flat-shaped and coupling the second members 51. The second unit 28 is formed of, for example, a synthetic resin material having a light blocking property as one body, but may be formed of a metallic material. Each of the second members 51 comprises a second opening portion 53 configured to allow light emitted from a light source 26 to the transparent portion 21 to pass therethrough, a duct-like second main body 54 defining the periphery of the second opening portion 53, and an overlapping portion 55 protruding from the second main body 54. In the present embodiment, the second unit 28 comprises seven second members 51 in total in correspondence with the seven light sources 26. Each of the second members 51 is brought into contact with a corresponding first member 41 so that the first opening portion 43 communicates with the second opening portion 53 (see FIG. 3).

As shown in FIGS. 7 and 8, the second main body 54 comprises four third walls 54A extending in a direction crossing or orthogonal to the printed circuit board 25. The second main body 54 comprises a cutout portion 56 for passing the reinforcing plate 31 therethrough (see FIG. 3).

The second coupling member 52 comprises a fixing hole 57 for fixing at each end. As shown in FIG. 6, the first case 36 of the main body cabinet 22 is provided with pins 58 configured to pass through the fixing holes 57. By melting the pins 58 at high temperature, the second unit 28 is welded and fixed to the first case 36 of the main body cabinet 22.

The overlapping portion 55 protruding from the second main body 54 is configured to form one continuous wall between the adjacent second members 51. As shown in FIG. 3, the overlapping portion 55 overlaps the periphery of the first main body 44 of the first member 41 at a position shifted frontward (F) relative to the first member 41. The overlapping portion 55 prevents light leakage from a minute gap between the first member 41 and the second member 51.

Figure 9:
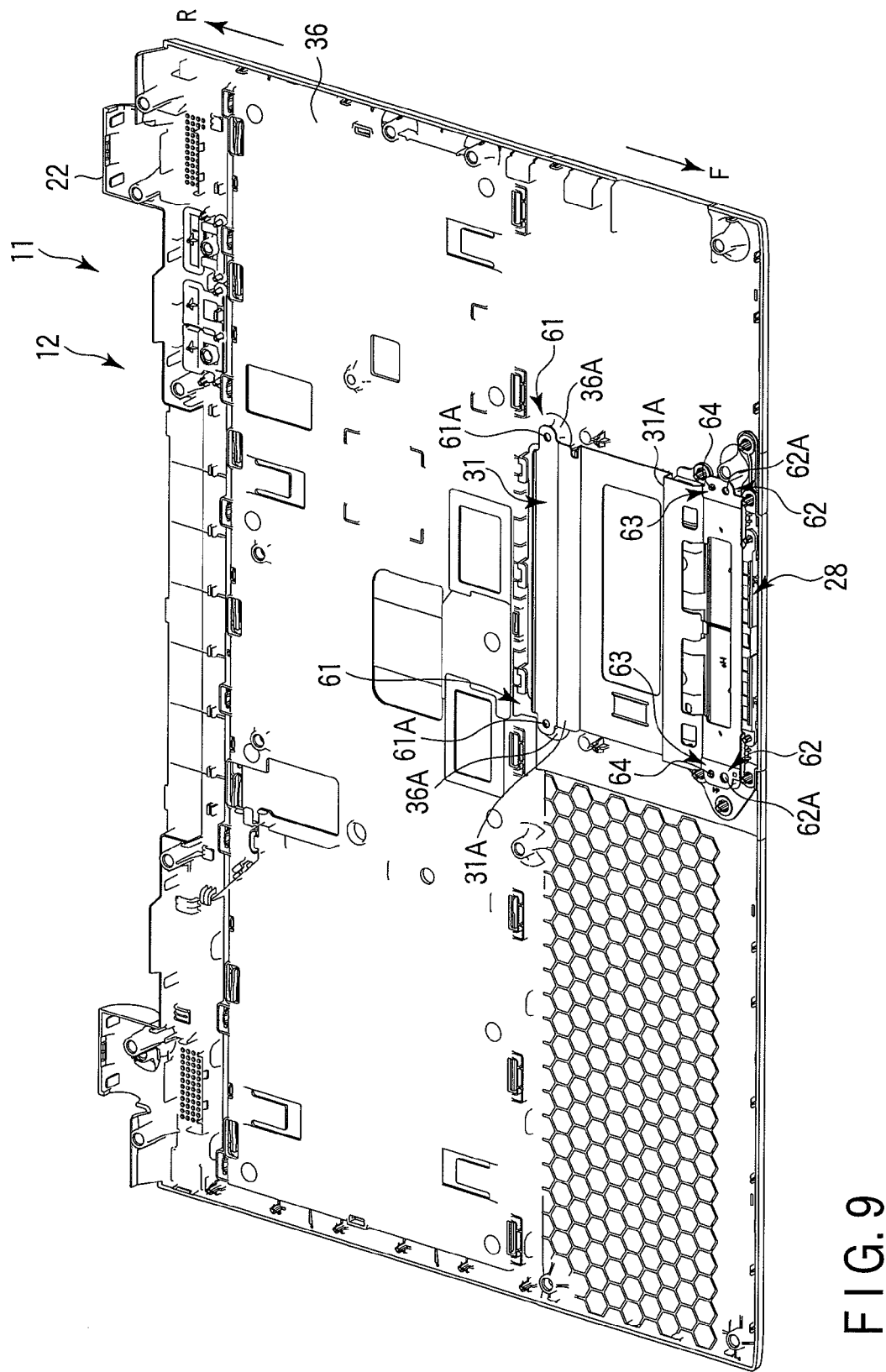
FIG. 9 is an exemplary perspective view showing the first case, second member, and reinforcing plate of the portable computer shown in FIG. 3.
Figure 10:
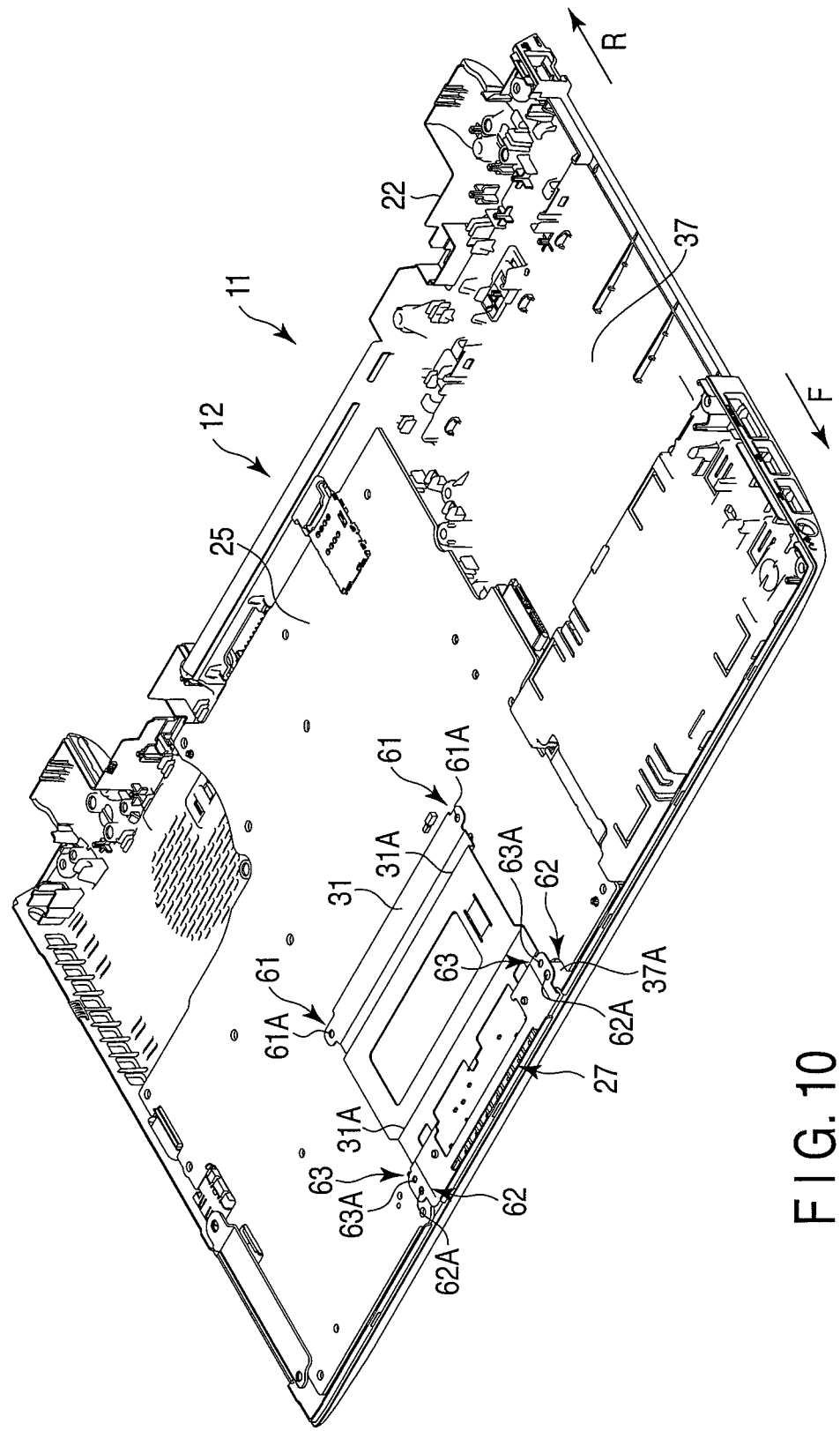
FIG. 10 is an exemplary perspective view showing the second case, printed circuit board, first member and reinforcing plate of the portable computer shown in FIG. 3.

As shown in FIGS. 9 and 10, the reinforcing plate 31 is formed of, for example, a metallic material in a square frame shape. The reinforcing plate 31 comprises, for example, first fixing portions 61 fixed to the first case 36, second fixing portions 62 fixed to the second case 37, and a positioning portion 63 for positioning the reinforcing plate 31 relative to the first case 36. As shown in FIG. 9, the first fixing portions 61 are located in the vicinities of corners at the rear R of the reinforcing plate 31. The first fixing portions 61 respectively comprise a pair of first through-holes 61A located in the vicinities of the corners. The first fixing portions 61 are fixed to first bosses 36A of the first case 36 by, for example, screws.

The second fixing portions 62 are located in the vicinities of corners at the front F of the reinforcing plate 31. The second fixing portions 62 respectively comprise a pair of second through-holes 62A located in the vicinities of respective corners. As shown in FIG. 10, the second fixing portions 62 are fixed to, for example, second bosses 37A of the second case 37 by, for example, screws on both sides in such a manner as to interpose the first member 41 and second member 51.

The positioning portion 63 is formed of a pair of through-holes 63A. The through-holes 63A are located in the vicinities of, for example, respective second through-holes 62A. The first case 36 comprises a pair of positioning pins 64 inserted into the through-holes 63A of the positioning portion 63. By inserting the positioning pins 64 in the through-holes 63A, the position of the reinforcing plate 31 relative to, for example, the first case 36 can be determined. The reinforcing plate 31 comprises some bent portions 31A, and has high stiffness against bending.

As shown in FIG. 3, the reinforcing plate 31 elastically supports the second members 51 of the second unit 28 at its front end portion 31A, thereby increasing the strength of the main body cabinet 22.

According to the first embodiment, the portable computer 11 comprises: the housing 32 comprising the transparent portion 21; the printed circuit board 25 contained in the housing 32; the light source 26 provided on the printed circuit board 25; the first member 41 fixed to the printed circuit board 25 and comprising the first opening portion 43 configured to allow light emitted from the light source 26 to the transparent portion 21 to pass therethrough and the duct-shaped first main body 44 defining the periphery of the first opening portion 43; the second member 51 comprising the second opening portion 53 configured to allow light emitted from the light source 26 to the transparent portion 21 to pass therethrough, and the duct-shaped second main body 54 defining the periphery of the second opening portion 53, the second member 51 being fixed to the inner surface of the transparent portion 21 and brought into contact with the first member 41 so that the first opening portion 43 communicates with the second opening portion 53; and the reinforcing plate 31 provided between the first member 41 and the second member 51, and fixed to the housing 32 on both sides between which the first member 41 and the second member 51 are provided.

With this configuration, the first member 41 and the second member 51 prevent light emitted from the light source 26 from leaking in an unintended direction, and enables the portable computer 11 to produce an appropriate lighting effect. Further, even when a user, for example, lands on their hand on the housing 32 and pressure is applied to the first case 36, the reinforcing plate 31 provided between the first member 41 and the second member 51 can prevent the pressure being directly transferred to the printed circuit board 25, thereby preventing a break or a fracture in the printed circuit board 25, which is caused by application of pressure to the printed circuit board 25.

The light source 26 is provided on the extending portion 25B projecting from the main portion of the printed circuit board 25, the first member 41 comprises the protruding portion 45 protruding from the first main body 44, and the protruding portion 45 surrounds the outer edge of the extending portion 25B. This configuration can prevent light emitted from the light source 26 parallel to the printed circuit board 25 from leaking from the gap between the first member 41 and the printed circuit board 25, thereby preventing light leakage in an unintended direction.

In addition, this configuration makes it possible to prevent light leakage even when the light source 26 is located as close to, for example, the end part of the extending portion 25B as possible, and to improve flexibility in design. Providing the extending portion 25B on the printed circuit board 25 and providing the light source 26 on the extending portion 25B eliminates the necessity of a small substrate specially for attaching the light source 26, and the number of components can be reduced. In addition, the protruding portion 45 protects the periphery of the extending portion 25B. Therefore, in a case where a shock from outside is applied, such as a case where the portable computer 11 is dropped, the extending portion 25B can be prevented from coming into contact with the housing 32, and, for example, chipping or cracking in the extending portion 25B can be prevented.

Further more, the housing 32 comprises the first case 36 to which the second member 51 is fixed and the second case 37 provided separately from the first case 36, and the fixing portion is fixed to the second case 37. With this configuration, even when a user, for example, places their hand on the housing 32, forcefully pushes the housing 32, and greatly bends the first case 36 together with the housing 32, pressure from the first case 36 is received by the reinforcing plate 31 since the reinforcing plate 31 is fixed to the second case 37. Therefore, such a large pressure as to bend the first case 36 together with the housing 32 can be prevented from being directly transferred to the printed circuit board 25, thereby preventing breakage of the printed circuit board 25.

The second member 51 comprises the overlapping portion 55 protruding from the second main body 54, and the overlapping portion 55 overlaps the periphery of the first main body 44 of the first member 41. This configuration can prevent light from leaking from the gap between the first member 41 and the second member 51, and enables the portable computer 11 to produce a more appropriate lighting effect.

The protruding portion 45 comprises the opposed portion 45A which is opposed to the housing 32, and the opposed portion 45A is slanted along the inner surface of the housing 32. This configuration can prevent interference between the protruding portion 45 and the inner surface of the housing 32, thereby preventing, for example, a shock from outside from being transferred to the printed circuit board 25 via the first member 41.

The transparent portion 21 is located at an oblique position shifted from a position facing the light sources 26, and the first main body 44 is located slantingly along an imaginary line connecting the light source 26 and the transparent portion 21. With this configuration, light emitted from the light source 26 to the transparent portion 21 is not blocked by the first main body 44, and the portable computer 11 can produce an appropriate lighting effect at the transparent portion 21. Further, the configuration increases flexibility in layout of the light source 26, printed circuit board 25 and transparent portion 21, and enables adoption of a more unique design.

Figure 11:
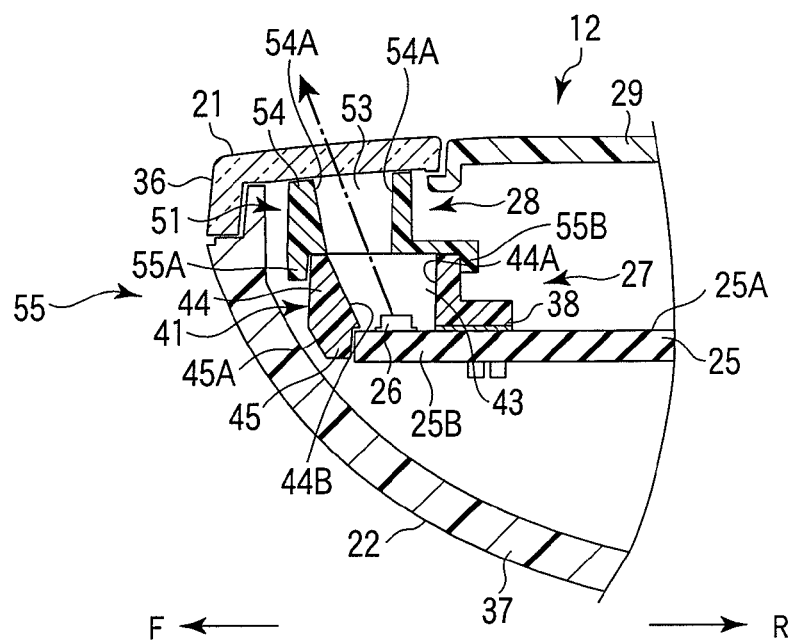
FIG. 11 is an exemplary sectional view taken in a longitudinal direction of the main unit of a portable computer which is an example of an electronic apparatus according to a second embodiment.

Next, referring to FIG. 11, a second embodiment of the electronic apparatus will be described. A portable computer 11, which is an example of the electronic apparatus of the second embodiment, is different from that of the first embodiment in terms of absence of the reinforcing plate 31 and the shape of the second unit 28. However, the other structures are common to those of the first embodiment. Therefore, different elements will be mainly explained. The same elements will be assigned the same reference symbols, and the explanations thereof will be omitted. The portable computer 11 of the second embodiment has the same appearance as that of the first embodiment shown in FIG. 1.

The second unit 28 is welded and fixed to the inner surface of the transparent portion 21. Like the one shown in FIG. 7, the second unit 28 comprises a plurality of second members 51, and a second coupling unit 52 substantially flat-shaped and coupling the second members 51. The second unit 28 is formed of, for example, a synthetic resin material having a light blocking property as one body, but may be formed of a metallic material. Each of the second members 51 comprises a second opening portion 53 configured to allow light emitted from the light source 26 to the transparent portion 21 to pass therethrough, a duct-shaped second main body 54 defining the periphery of the second opening portion 53, and a first overlapping portion 55A and second overlapping portion 55B protruding from the second main body 54. In the present embodiment, the second unit 28 comprises seven second members 51 in total in correspondence with the seven light sources 26. The second member 51 is brought into contact with the first member 41 so that the first opening portion 43 of the first member 41 communicates with the second opening portion 53.

The second main body 54 comprises four third wall portions 54A extending in a direction crossing or orthogonal to the printed circuit board 25. The second main body 54 comprises a cutout portion 56 for passing the reinforcing plate 31 therethrough.

The second coupling portion 52 comprises a fixing hole 57 for fixing at each end. The first case 36 of the main body cabinet 22 is provided with pins 58 configured to pass through the fixing holes 57. By melting the pins 58 at high temperature, the second unit 28 is welded and fixed to the main body cabinet 22 (first case 36).

As in the first embodiment, the first overlapping portion 55A and second overlapping portion 55B protruding from the second main body 54 are each configured to form one continuous wall between the adjacent second members 51. The first overlapping portion 55A overlaps the periphery of the first main body 44 of the first member 41 at a position shifted frontward (F) relative to the first member 41. The second overlapping portion 55B overlaps the periphery of the first main body 44 of the first member 41 at a position shifted rearward (R) relative to the first member 41. Accordingly, the first main body 44 is interposed between the first overlapping portion 55A and the second overlapping portion 55B. The first overlapping portion 55A and the second overlapping portion 55B prevent light leakage from a minute gap between the first member 41 and the second member 51.

According to the second embodiment, the portable computer 11 comprises: the housing 32 comprising the transparent portion 21; the printed circuit board 25 contained in the housing 32; the light source 26 provided on the printed circuit board 25; the first member 41 fixed to the printed circuit board 25 and comprising the first opening portion 43 configured to allow light emitted from the light source 26 to the transparent portion 21 to pass therethrough, and the duct-shaped first main body 44 defining the periphery of the first opening portion 43; and the second member 51 comprising the second opening portion 53 configured to allow light emitted from the light source 26 to the transparent portion 21 to pass therethrough, and the duct-shaped second main body 54 defining the periphery of the second opening portion 53, the second member 51 being fixed to the inner surface of the transparent portion 21 and brought into contact with the first member 41 so that the first opening portion 43 communicates with the second opening portion 53.

With this configuration, the first member 41 and the second member 51 appropriately guide light emitted from the light source 26 to the transparent portion 21, and light leakage in an unintended direction in the housing 32 can be prevented.

The light source 26 is provided on the extending portion 25B projecting from the main portion 25A of the printed circuit board 25, the first member 41 comprises the protruding portion 45 protruding from the first main body 44, and the protruding portion 45 surrounds the outer edge of the extending portion 25B. This configuration can prevent light emitted from the light source 26 parallel to the printed circuit board 25 from leaking from between the first member 41 and the printed circuit board 25. Consequently, a design with improved flexibility, such as a design in which the light source 26 is located as close to, for example, the end part of the extending portion 25B as possible, becomes possible. Further, the necessity of a small substrate specially for attaching the light source 26 is eliminated, and the number of components can be reduced. In addition, the protruding portion 45 protects the periphery of the extending portion 25B. Therefore, in a case where a shock from outside is applied, such as a case where the portable computer 11 is dropped, the extending portion 25B can be prevented from coming into contact with the housing 32, and, for example, chipping or cracking in the extending portion 25B can be prevented.

The second member 51 comprises the first overlapping portion 55A and second overlapping portion 55B protruding from the second main body 54, and the first main body 44 is interposed between the first overlapping portion 55A and the second overlapping portion 55B. With this configuration, light leakage from the gap between the first member 41 and the second member 51 can be prevented in two directions. Consequently, light leakage in an unintended direction does not occur, and a more appropriate light effect can be produced.

In the present embodiment, the second unit 28 is welded and fixed to the inner surface of the transparent portion 21. However, the second unit 28 may be located apart from the first case 36 (transparent portion 21) of the main body cabinet 22. In a modified embodiment, the second unit 28 is fixed to the first case 36 (transparent portion 21) via, for example, a spacer, and the second member 51 of the second unit 28 is located between the first member 41 and the transparent portion 21 at a position apart from the printed circuit board 25.

Figure 12:
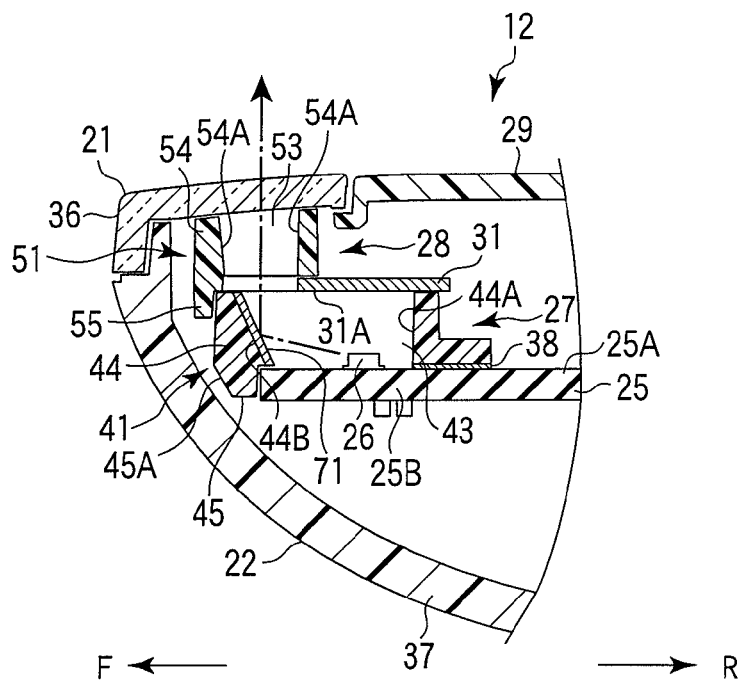
FIG. 12 is an exemplary sectional view taken in a longitudinal direction of the main unit of a portable computer which is an example of an electronic apparatus according to a third embodiment.

Next, referring to FIG. 12, a third embodiment of the electronic apparatus will be described. A portable computer, which is an example of the electronic apparatus of the third embodiment, is different from that of the first embodiment in terms of the structure of the first unit 27, structure of the light source 26, and positional relationship between the light source 26 and the transparent portion 21. However, the other structures are common to those of the first embodiment. Therefore, different elements will be mainly explained. The same elements will be assigned the same reference symbols, and the explanations thereof will be omitted. The portable computer 11 of the second embodiment has the same appearance as that of the first embodiment shown in FIG. 1.

In the present embodiment, the transparent portion 21 is located at an oblique position shifted from a position facing the light sources 26. The light source 26 is located more rearward (R) than in the first embodiment. In the present embodiment, the light source 26 is formed of a side-lighting-type light emitting diode. Seven light sources 26 are laterally aligned on the extending portion 25B of the printed circuit board 25.

The first unit 27 is fixed to the printed circuit board 25 by, for example, double-sided tape 38. Like the one shown in FIG. 4, the first unit 27 comprises a plurality of first members 41 and a first coupling portion 42 substantially flat-shaped and coupling the first members 41. The first unit 27 is formed of, for example, a synthetic resin material having a light blocking property as one body, but may be formed of a metallic material. Each of the first members 41 comprises a first opening portion 43 configured to allow light emitted from the light source 26 to the transparent portion 21 to pass therethrough, a duct-shaped first main body 44 defining the periphery of the first opening portion 43, and a protruding portion 45 protruding from the first main body 44. In the present embodiment, the first unit 27 comprises seven first members 41 in total in correspondence with the seven light sources 26.

Like the ones shown in FIG. 6, the protruding portions 45 protruding from respective first main bodies 44 are continuous and integral with each other, and are each U-shaped, for example. The protruding portions 45 surround the outer edge of the extending portion 25B of the printed circuit board 25, and protect the extending portion 25B so as to prevent chipping or cracking at corners 46 of the projection portion 25B. The protruding portions 45 may be separately provided in correspondence with the first main bodies 44.

In a state where the first unit 27 is attached to the printed circuit board 25, the first main body 44 surrounds the periphery of each of the light sources 26. The first main body 44 comprises three first walls 44A extending in a direction crossing or orthogonal to the printed circuit board 25, and one second wall 44B slantingly provided relative to the printed circuit board 25. Since the second wall 44B is slanted relative to the printed circuit board 25, the first main body 44 is slanted as a whole along an imaginary line connecting the light source 26 and the transparent portion 21.

The first main body 44 comprises, for example, a mirror-like reflective plate 71 (reflective part) on the inner surface of the second wall 44B. As shown in FIG. 12, the reflective plate 71 can reflect, to the transparent portion 21, light emitted from the light source 26 substantially parallel to the printed circuit board 25.

According to the third embodiment, the first main body 44 comprises the reflective part on its inner surface, and the reflective part can reflect light from the light source 26 to the transparent portion 21. With this configuration, even when the light source 26 is further shifted from the transparent portion 21, light from the light source 26 can be directed to the transparent portion 21. Accordingly, the flexibility in design related to the positional relationship between the light source 26 and the transparent portion 21 can be further increased. By use of the reflective part, light emitted from the light source 26 to the eyes of a user can be intentionally obstructed, and due consideration can be given to the user's convenience.

The electronic apparatus is not limited to the portable computer 11 described in the above embodiments, and may be another electronic apparatus such as a television, cellular telephone or electronic book reader for electrically display books, images or the like.

Further, the electronic apparatus may not necessarily be embodied just as described above, and the structural elements of the electronic apparatus may be modified within the spirit of the invention in the stage of implementation. Further, the invention is variously embodied by appropriately combining a plurality of structural elements disclosed in the above descriptions of embodiments. For example, some structural elements may be omitted from all the structural elements disclosed in the above descriptions of embodiments. Moreover, structural elements in different embodiments may be combined where necessary.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, comprising:
a housing comprising a transparent portion;
a printed circuit board in the housing;
a light source on the printed circuit board;
a first member fixed to the printed circuit board, the first member comprising a duct-shaped first main body defining a periphery of a first opening portion, the first opening portion configured to allow light emitted from the light source to pass to the transparent portion;
a second member comprising a duct-shaped second main body defining a periphery of a second opening portion, the second opening portion configured to allow light emitted from the light source to pass to the transparent portion, wherein the second member is fixed to an inner surface of the transparent portion and is in contact with the first member, the first opening portion in communication with the second opening portion; and
a reinforcing plate between the first member and the second member, the reinforcing plate comprising a first fixing portion interposing the first member between the reinforcing plate and the housing, and a second fixing portion interposing the second member between the reinforcing plate and the housing.

2. The electronic apparatus of claim 1, wherein
the printed circuit board comprises a main portion and an extending portion projecting from the main portion, and
wherein the light source is on the extending portion of the printed circuit board, and
wherein the first member comprises a protruding portion protruding from the first main body, the protruding portion surrounding an outer edge of the extending portion.

3. The electronic apparatus of claim 2, wherein
the housing comprises:
a first case to which the second member is fixed; and
a second case separate from the first case, and
wherein the second fixing portion is fixed to the second case.

4. The electronic apparatus of claim 3, wherein the second member comprises an overlapping portion protruding from the second main body, the overlapping portion overlapping a periphery of the first main body of the first member.

5. The electronic apparatus of claim 4, wherein
the protruding portion comprises an opposing portion opposed to the housing, and
the opposing portion is slanted along an inner surface of the housing.

6. The electronic apparatus of claim 5, wherein
the transparent portion is oblique with respect to the light source and shifted from a position facing the light source, and
wherein the first main body is slanted along an axis connecting the light source and the transparent portion.

7. The electronic apparatus of claim 5, wherein the first main body comprises a reflective portion on an inner surface thereof, and the reflective portion is configured to reflect light from the light source to the transparent portion.

8. An electronic apparatus, comprising:
a housing comprising a transparent portion;
a printed circuit board in the housing, the printed circuit board comprising an extending portion which is integrally formed with the printed circuit board;
a light source on the extending portion of the printed circuit board;
a first member on the printed circuit board, the first member comprising a first opening portion surrounding the light source and a portion surrounding an outer edge of the extending portion; and
a second member, which is another component with respect to the housing, apart from the printed circuit board, between the first member and the transparent portion, the second member comprising a second opening portion configured to allow light from the first opening portion to pass therethrough.

9. An electronic apparatus, comprising:
a housing comprising an transparent portion;
a printed circuit board in the housing, the printed circuit board comprising an extending portion;
a light source on the extending portion of the printed circuit board;
a first member on the printed circuit board, the first member comprising a first opening portion surrounding the light source and a portion surrounding an outer edge of the extending portion; and
a second member, apart from the printed circuit board, between the first member and the transparent portion, the second member comprising a second opening portion configured to allow light from the first opening portion to pass therethrough,
wherein:
the first member comprises a duct-shaped first main body defining a periphery of the first opening portion,
the second member comprises a duct-shaped second main body defining a periphery of the second opening portion, and a first overlapping portion and second overlapping portion protruding from the second main body, and
the first main body is interposed between the first overlapping portion and the second overlapping portion.

10. The electronic apparatus of claim 8, wherein
the second member is in contact with the first member, and
the first opening portion is in communication with the second opening portion.

11. The electronic apparatus of claim 8, wherein
the printed circuit board comprises a main portion, and
the extending portion projects from the main portion.

12. The electronic apparatus of claim 8, wherein
the first member comprises a first main body defining a periphery of the first opening portion, and
the portion of the first member which surrounds the outer edge of the extending portion is a protruding portion protruding from the first main body.

13. The electronic apparatus of claim 12, wherein
the protruding portion comprises an opposing portion opposed to the housing, and
the opposing portion is slanted along an inner surface of the housing.

14. The electronic apparatus of claim 8, wherein
the first member comprises a first main body defining a periphery of the first opening portion, and
the second member comprises a second main body defining the periphery of the second opening portion and an overlapping portion protruding from the second main body, the overlapping portion overlapping a periphery of the first main body of the first member.

15. The electronic apparatus of claim 8, wherein
the first member comprises a first main body defining a periphery of the first opening portion,
the transparent portion is oblique with respect to the light source and shifted from a position facing the light source, and
wherein the first main body is slanted along an axis connecting the light source and the transparent portion.

16. The electronic apparatus of claim 8, wherein
the first member comprises a first main body defining a periphery of the first opening portion, and
the first main body comprises a reflective portion on an inner surface thereof, and the reflective portion is configured to reflect light from the light source to the transparent portion.

* * * * *